US008006901B2

(12) United States Patent
Sato et al.

(10) Patent No.: US 8,006,901 B2
(45) Date of Patent: Aug. 30, 2011

(54) MOBILE TERMINAL, REGISTER DEVICE, AND COMMODITY SALE PROCESSING SYSTEM

(75) Inventors: Naokazu Sato, Tokyo (JP); Naofumi Narita, Tokyo (JP); Kunio Mori, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 0 days.

(21) Appl. No.: 12/425,579

(22) Filed: Apr. 17, 2009

(65) Prior Publication Data
US 2009/0261164 A1 Oct. 22, 2009

(30) Foreign Application Priority Data
Apr. 22, 2008 (JP) ................................ 2008-111375

(51) Int. Cl.
G06F 17/00 (2006.01)
G06K 5/00 (2006.01)
G06K 15/00 (2006.01)
G06K 7/10 (2006.01)
G06Q 20/00 (2006.01)
G06Q 30/00 (2006.01)

(52) U.S. Cl. ... 235/383; 235/375; 235/380; 235/462.01; 705/16; 705/17; 705/20; 705/21; 705/26.1; 705/23; 705/41; 705/64

(58) Field of Classification Search .................. 235/375, 235/380, 383, 462.01–462.49; 705/16–17, 705/20–21, 26–28, 23, 41, 64
See application file for complete search history.

(56) References Cited

U.S. PATENT DOCUMENTS

| 5,543,607 | A | 8/1996 | Watanabe et al. |
| 5,923,735 | A | 7/1999 | Swartz et al. |
| 6,672,506 | B2* | 1/2004 | Swartz et al. ............... 235/383 |
| 2003/0102373 | A1 | 6/2003 | Swartz et al. |
| 2007/0158417 | A1* | 7/2007 | Brewington ............... 235/383 |
| 2007/0194112 | A1* | 8/2007 | Petroskey ................. 235/383 |

FOREIGN PATENT DOCUMENTS

| JP | 6-243340 | 9/1994 |
| WO | 2005/104050 | 11/2005 |

OTHER PUBLICATIONS

International Search Report dated Jul. 15, 2009, for corresponding European Patent Application 09158202.3.

* cited by examiner

Primary Examiner — Michael G Lee
Assistant Examiner — Laura Gudorf
(74) Attorney, Agent, or Firm — K&L Gates LLP

(57) ABSTRACT

A mobile terminal is provided. A scanner unit reads code information attached to a commodity. A RAM stores the code information read by the scanner unit as commodity-for-purchase information. The scanner unit, to confirm whether the commodity-for-purchase information stored in the RAM is correct, the scanner unit reads the code information of one part of the commodity-for-purchase. A CPU switches from reading for storage to reading for confirmation. It is determined whether information contained in the code information read by the scanner unit is stored in the RAM. A display displays a result of the determination.

8 Claims, 13 Drawing Sheets

FIG. 2

| COMMODITY CODE | COMMODITY NAME | PRICE (YEN) | PRICE (YEN) |
|---|---|---|---|
| 11111 | GRILLED MEAT SET MEAL | 550 | 650 |
| 11112 | CHOCOLATE | 178 | 178 |
| 11113 | TOILET PAPER | 185 | 298 |
| 11114 | FRIED CHICKEN LUNCH BOX | 450 | 550 |
| ... | ... | ... | ... |

FIG. 3

| EMPLOYEE NUMBER | NAME |
|---|---|
| 90001 | AAAA |
| 90002 | BBBB |
| 90003 | |
| ... | ... |

MOBILE TERMINAL, REGISTER DEVICE, AND COMMODITY SALE PROCESSING SYSTEM

CROSS REFERENCES TO RELATED APPLICATIONS

This application claims priority to Japanese Patent Application No. 2008-111375, filed on Apr. 22, 2008 in the Japanese Patent Office, the disclosure of which is incorporated herein by reference.

BACKGROUND

In retail stores such as supermarkets, a device such as a point-of-sale (POS) register (i.e. a cash register) is used to register and checkout commodities purchased by customers visiting the store. The POS register is usually operated by a store employee who registers and checks out the commodities by using a barcode scanner connected to the POS register to read barcodes appended to the commodities.

Recently, there are proposals for a commodity sale processing system known as a self-checkout system, where customers visiting the store themselves read the barcodes, thereby preventing crowding at the register during busy hours and reducing the workload on the store (e.g. Japanese Unexamined Patent Application, First Publication No. H6-243340).

According to Japanese Unexamined Patent Application, First Publication No. H6-243340, a customer who has selected commodities for purchase goes to a place where a self-checkout system is installed, uses a scanner of the system to read a barcode appended to the commodity, and deposits the commodity whose barcode was read on a belt conveyor of the system. The barcode of the deposited commodity is read again while it is being conveyed. In the self-checkout system according to Japanese Unexamined Patent Application, First Publication No. H6-243340, when the barcode read by an operation performed by the customer and the barcode read while being conveyed on the belt conveyor match, commodity registration is deemed legitimate, whereas when they do not match, a process is executed for prompting the customer to read the barcode again.

However, Japanese Unexamined Patent Application, First Publication No. H6-243340 reveals a problem that confirming all commodities purchases is time consuming. While one conceivable method of reducing checkout time is to delete the process of confirming commodity purchases, when customers themselves are registering commodities, an opportunity is needed to restrict incorrect registrations. Another problem of self-checkout systems such as that described in Japanese Unexamined Patent Application, First Publication No. H6-243340 is that they are not easy to install, since they require large equipment including carrying devices.

SUMMARY

The present application relates to a commodity sale processing system, and more particularly relates to a mobile terminal for enabling a customer visiting a store to read codes of commodities, a register device for performing checkout based on the commodity codes read by the mobile terminal, and a commodity sale processing system including the mobile terminal and the register device.

The present application has been achieved in view of the above points, and an object thereof is to provide a mobile terminal, a register device, and a commodity sale processing system that can, with a simple configuration, restrict incorrect registrations by customers and reduce checkout time.

In an embodiment, a mobile terminal is provided in a commodity sale processing system whereby a customer visiting a store reads code information corresponding to commodities, and performs checkout at a register device based on the code information that was read. The mobile terminal includes a reading device that reads the code information attached to commodity, a storage device that stores the code information read by the reading device as commodity-for-purchase information, a confirming device that, to confirm whether commodity-for-purchase information stored in the storage device is correct, reads code information of one part of the commodity-for-purchase, a switching device that switches from reading for storing in the storage unit to reading by the confirming device, a determining device that determines whether code information that was read by the confirming device is stored in the storage device, and a reporting device that reports a result of the determining device.

Thus, by confirming whether part of the commodity for actual purchase in a shopping basket or the like was indeed read by the customer, it can be anticipated, when it matches, that there is no error in the commodity registration as a whole, whereas, when there is an error in part of the commodity, since there is an error at least for those items, processing can be altered so that commodity-for-purchase information registered by the customer is not used, and, since determination is made only with respect to part of the commodity, the checkout operation can proceed without delay. Further, since confirmation of registered commodities is performed, albeit with respect to one part of the commodity-for-purchase, incorrect registration of commodities by the customer can also be suppressed.

Moreover, since commodity registration can be confirmed using the same mobile terminal storing the commodity-for-purchase information therein, no special device is required for confirmation, whereby the commodity-for-purchase information can be confirmed with a simple configuration.

Furthermore, in the mobile terminal of the embodiment, commodity information relating to code information that was read for execution by the confirming device is controlled so as not to be added to the storage device.

Accordingly, confirmation alone can be expedited without taking a long time to delete the data read for confirmation since data that has been read is not stored as commodity-for-purchase information while confirming purchased commodities.

Furthermore, in the mobile terminal of the embodiment, the reporting device is a display unit, which displays indicator information that functions as an indicator when the confirming device executes reading.

Since information used as an indicator for reading codes of items of the commodity-for-purchase that are targets for determination can be displayed on the display unit, the employee need not think about which items of commodity-for-purchase he or she should select for confirmation, enabling him to speedily confirm whether the commodity-for-purchase information is correctly registered.

Furthermore, in the mobile terminal of the embodiment, the indicator information is a number of items of commodities for execution by the confirming device.

Since a specific number of items of commodities whose codes are to be read is specified in this way, the employee need not think about how many items of commodities he or she should confirm, enabling him to speedily confirm whether the commodity-for-purchase information is correctly registered.

Furthermore, in the mobile terminal of the embodiment, the storage device stores a commodity file, which contains information such as a commodity name and price corresponding to the code information, for each item of commodity, and the indicator information specifies items of commodities for executing the confirming device.

Since commodities whose codes are to be read are thus specified, the employee need not think about which items to confirm, enabling him to speedily confirm whether the commodity-for-purchase information is registered correctly.

In an embodiment a mobile terminal is provided in a commodity sale processing system whereby a customer visiting a store reads code information corresponding to commodity, and performs checkout at a register device based on the code information that was read, the mobile terminal including a reading device that reads the code information attached to commodity, a storage device that stores at least the code information read by the reading device as commodity-for-purchase information, and a reporting device that, to confirm whether commodity-for-purchase information stored in the storage device is correct, reports information identifying items of commodity, from among the code information stored in the storage device, whose code information satisfies a predetermined condition.

Thus, from among the commodity-for-purchase information, items of commodities that are, for example, expensive or whose appearance is difficult to distinguish are reported to the employee, enabling him to confirm items of commodities that might be incorrect, and, since names of only one part of the commodity-for-purchase information are reported to him, he or she can speedily perform the checkout process. Moreover, since confirmation of registered commodity is performed, albeit with respect to one part of the commodity-for-purchase, incorrect registration of commodity by the customer can also be suppressed. That is, indicator information need only be displayed on the reporting device of the mobile terminal. An operating key for displaying the indicator information can be provided in only the mobile terminal. That is, the matter of whether to confirm the commodity using the mobile terminal or to display only indicator information on the mobile terminal is confirmed after the customer has registered the commodity, the difference being merely whether the mobile terminal makes the determination or an employee makes the determination, the objectives and techniques being the same.

In the mobile terminal of the embodiment, the reporting device reports a most expensive item of commodity-for-purchase among the commodity-for-purchase information stored in the storage device.

Since a specific item of commodity is thus specified, the employee need not think about which item he or she should confirm, enabling him to speedily confirm whether the commodity-for-purchase information is correctly registered.

In an embodiment, a commodity sale processing system includes a register device that performs checkout based on commodity codes read by the mobile terminal when manipulated by the customer.

Thus, by confirming whether part of the commodity for actual purchase in a shopping basket or the like was indeed read by the customer, it can be anticipated, when it matches, that there is no error in the commodity registration as a whole, whereas, when there is an error in part of the commodity, since there is an error at least for those items, processing can be altered so that commodity-for-purchase information registered by the customer is not used, and, since determination is made only with respect to part of the commodity, the checkout operation can proceed without delay. Further, since confirmation of registered commodity is performed, albeit with respect to one part of the commodity-for-purchase, incorrect registration of commodity by the customer cart also be suppressed.

Further, since commodity registration can be confirmed using the same mobile terminal that the commodity-for-purchase information is stored in, no special device is required for confirmation, whereby the commodity-for-purchase information can be confirmed with a simple configuration.

In an embodiment, a register device in a commodity sale processing system is provided whereby a customer reads code information corresponding to commodity by manipulating a mobile terminal, stores the code information that was read as commodity-for-purchase information, transfers the stored commodity-for-purchase information to the register device, and performs checkout at the register device. The register device includes a registration-information storage device that stores transferred commodity-for-purchase information, a confirming device that, to confirm whether the transferred commodity-for-purchase information is correct, reads the code information of one part of the commodity-for-purchase, a determining device that determines whether the code information read by the confirming device is stored in the registration-information storage device, and a reporting device that reports a result of the determining device.

Thus, by confirming whether one part of the commodity for actual purchase was indeed read by the customer, it can be anticipated, when it matches, that there is no error in the commodity registration as a whole, whereas, when there is an error in part of the commodity, since there is an error at least for those items, processing can be altered so that commodity-for-purchase information registered by the customer is not used. Also, since determination is made only with respect to part of the commodity, the checkout operation can proceed without delay. Further, since confirmation of registered commodity is performed, albeit with respect to one part of the commodity-for-purchase, incorrect registration of commodity by the customer can also be suppressed. Moreover, since confirmed is made using the register device, the commodity-for-purchase information can be reliably confirmed before executing the checkout process.

According to the embodiment, checkout time can be shortened, and an effect that incorrect registration by customers will be suppressed with a simple device can be obtained.

The above and other aspects of the present application will become apparent upon consideration of the following detailed descriptions of exemplary embodiment thereof, particularly when taken in conjunction with the accompanying drawings wherein like reference numerals in the various figures are utilized to designate like components.

Additional features and advantages are described herein, and will be apparent from the following Detailed Description and the figures.

BRIEF DESCRIPTION OF THE FIGURES

FIG. 2 is a diagram of one example of commodity master data according to the embodiment.

FIG. 3 is a diagram of one example of a bargain section according to the embodiment.

DETAILED DESCRIPTION

Embodiments will be explained in detail with respect to the drawings.

Figure 1:
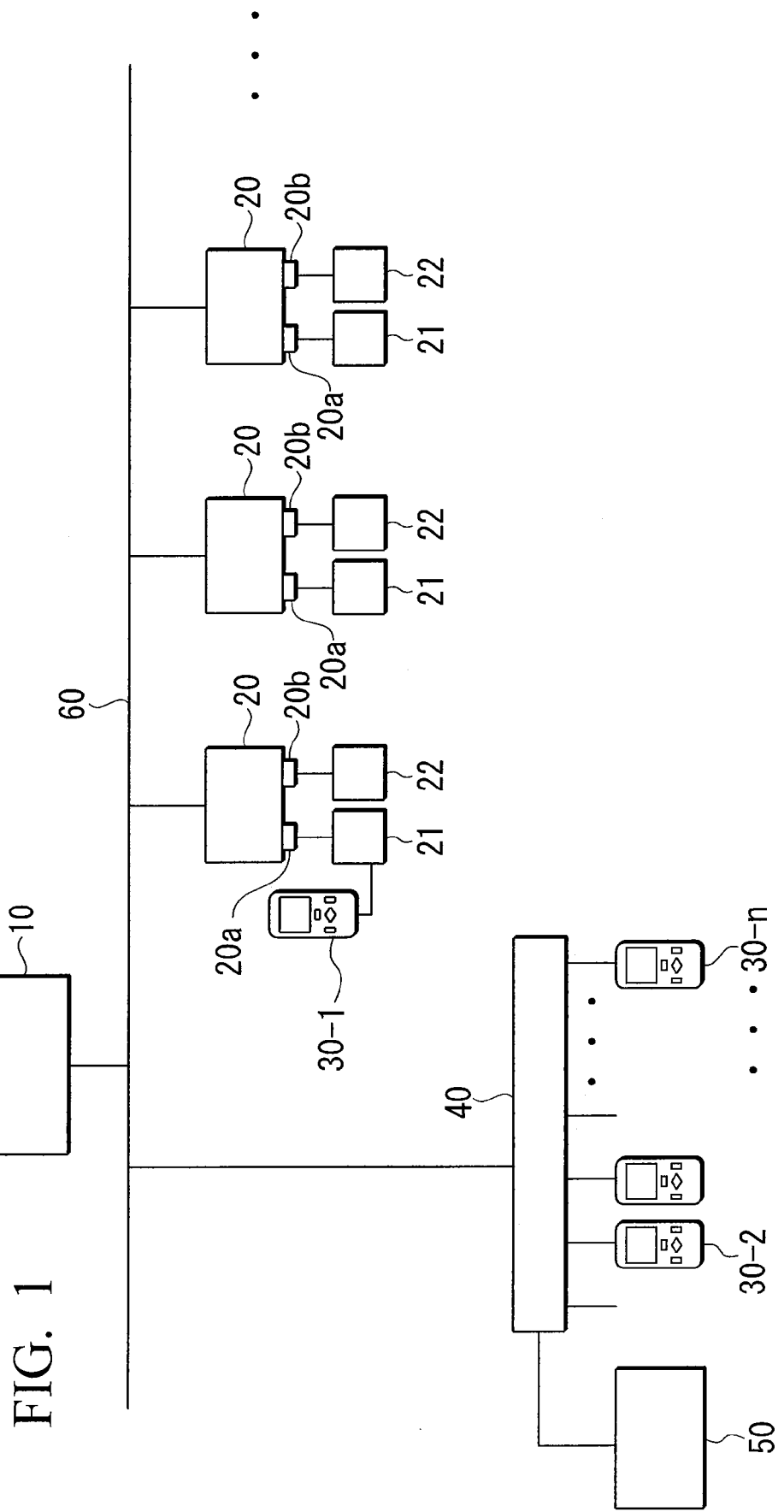
FIG. 1 is a system configuration diagram of a commodity sale processing system according to an embodiment.

FIG. 1 is a diagram of a system configuration of a commodity sale processing system according to a first embodiment. In this drawing, the commodity sale processing system includes a store controller 10, a plurality of POS registers 20, n handy terminals 30-1 to 30-n (mobile terminals) for use by customers visiting the store in reading codes of commodities, a register cradle 21 (relay device) that is connected by wire to each POS register 20 and is set when a handy terminal checks out commodity-for-purchase, a scanner 22, a customer cradle 40 where a handy terminal is mounted when not in use, and a membership card reader 50. A local area network (LAN) 60 connects each POS register 20, the customer cradle 40, and the store controller 10.

Here, the store controller 10 and the POS registers 20 are existing device or the likes that are already installed in a small store where the commodity sale processing system is to be set up. The commodity sale processing system is set up by additionally installing the register cradle 21, the handy terminals 30-1 to 30-n, the customer cradle 40, and the membership card reader 50.

The store controller 10 is a computer that manages various types of files and data including commodity master data, employee files, and members' files. FIG. 2 is an example of commodity master data. The commodity master data displayed in table format has several attributes of Commodity Code, Commodity Name, Price, and Bargain Price. One row contains information for one piece of commodities. For example, the commodity name whose commodity code is 11111 indicates a grilled meat set meal, while its price is ¥650, and its bargain price is ¥550. Information for other commodity is as shown in FIG. 2.

FIG. 3 is an example of an employee file. The employee file is displayed in table format having attributes including Employee Number and Name. One row contains information for one employee. For example, the name (employee's name) of employee number 90001 is AAAA. Information for other employees is as shown in FIG. 3.

In this embodiment, the first digit of the commodity codes is for example 1, and the first digit of the employee numbers is for example 9. When a scanner unit 304 of a handy terminal 30 reads a barcode, the scanner unit 304 acknowledges that, if the first digit of the code is 1, it has read commodity information, and if the first digit is 9, it has read employee information.

The POS registers 20 are devices for performing registration and checkout of commodities purchased by customers visiting the store, and include various operating keys, a display unit, etc. Each POS register 20 is connected using a predetermined cable via a connection connector 20b to a barcode scanner, originally used for reading a commodity barcode in accordance with an operation performed by an employee. The register cradle 21 is connected to a connection connector 20a. These connections use the same communication standard as the barcode scanner, e.g. RS-232C Interface. Thus data is transmitted by RS-232C serial communication between the POS register 20 and the register cradle 21, and the handy terminal 30 after it is mounted on the register cradle 21. A register-side terminal and a handy terminal-side terminal of the register cradle 21 are directly connected by signal wire. That is, a CPU of the POS registers recognizes information inputted from the connection connector 20a or the connection connector 20b as commodity-for-purchase information.

In the retail store where the commodity sale processing system is installed, customer cradles 40 and membership card readers 50 are provided near the store entrance. A plurality of unused handy terminals 30 for use by customers visiting the store are set in the customer cradles 40. One of the handy terminals 30 becomes usable when a customer passes his or her membership card through the membership card reader 50. The customer removes the handy terminal 30 from the customer cradle 40 and starts shopping. The customer makes the handy terminal 30 read the codes of commodities he or she wishes to purchase, and goes lastly to the POS register 20 where he sets his or her handy terminal 30 in the register cradle 21 (in FIG. 1, handy terminal 30-1 is set).

Subsequently, commodity-for-purchase information such as codes of the commodities that were read is transmitted from the handy terminal 30 via the register cradle 21 to the POS register 20, and stored in a registration-information storage device. The POS register 20 registers the commodity by referring to commodity master data held in an unillustrated memory (received from the store controller 10 as described above) based on the commodity-for-purchase information. The POS register 20 thus calculates a total price of the commodity-for-purchase, and displays the calculated total price and the like on a display unit. When an employee performs checkout, a sale record file is updated by executing a checkout process, and a receipt is issued.

The customer cradle 40 includes a CPU and a memory (not shown), and has a communication function for communicating with the store controller 10, the handy terminal 30 that was set, and the membership card reader 50. The customer cradle 40 stores the commodity master data transmitted from the store controller 10 in the memory, and, when the handy terminal 30 is set, updates the commodity master data in the handy terminal 30. The customer cradle 40 also manages the sequence of a plurality of handy terminals 30 that are set, and transmits membership number data from the membership card reader 50 to the one that was set earliest.

Figure 4:
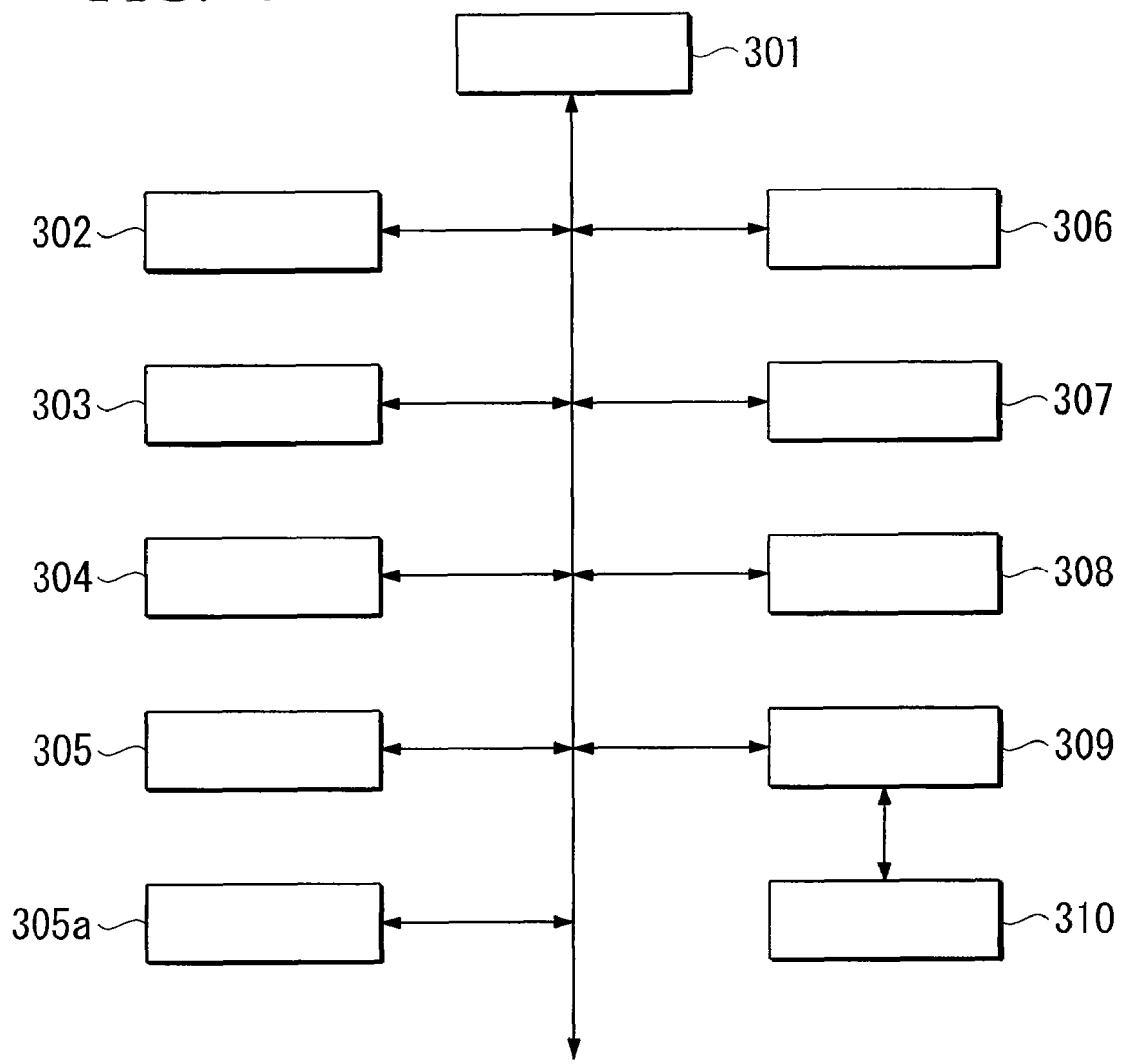
FIG. 4 is a block diagram of the configuration of a handy terminal in the commodity sale processing system of FIG. 1.
Figure 5:
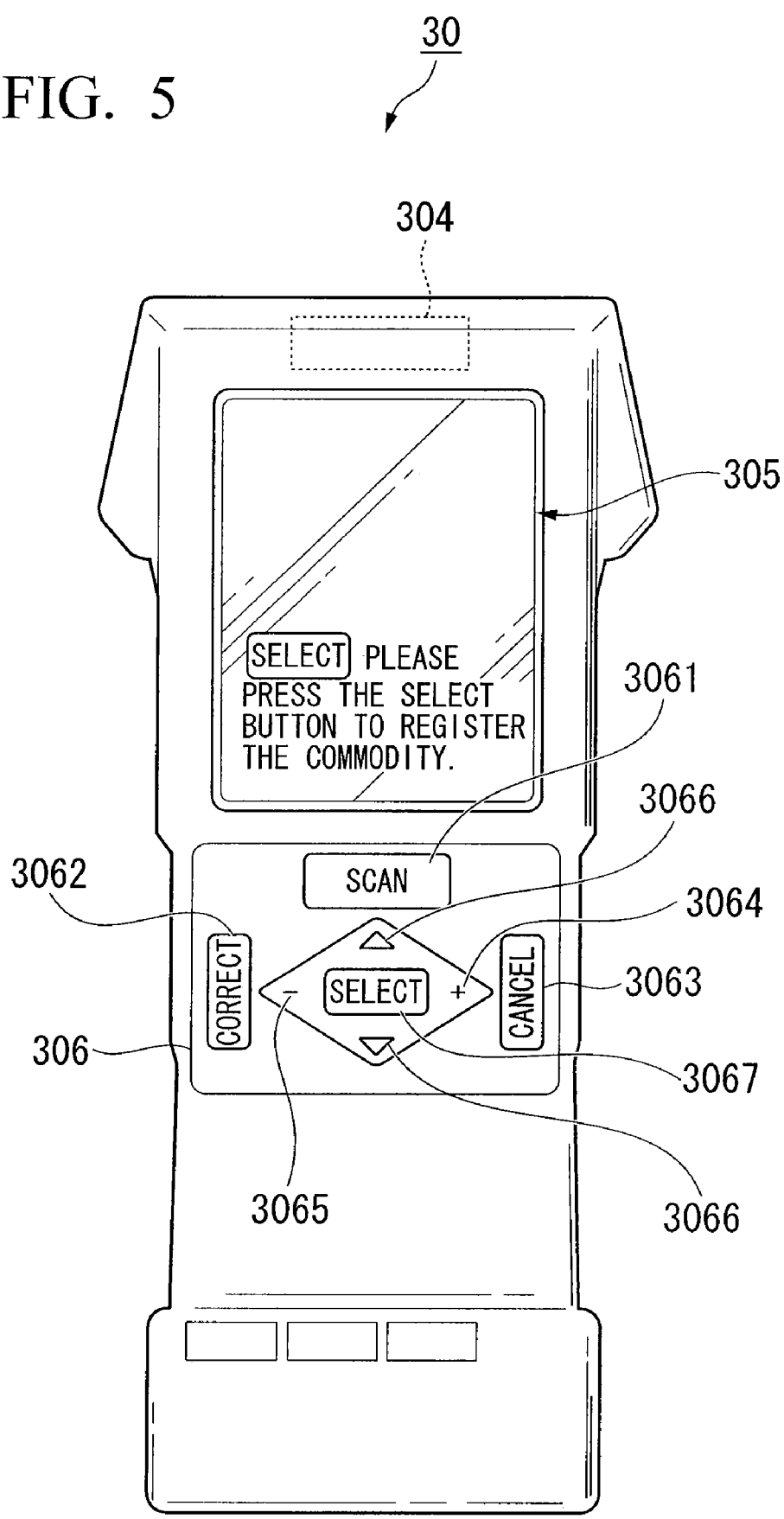
FIG. 5 is a top-side external view of the handy terminal of FIG. 4.
Figure 6:
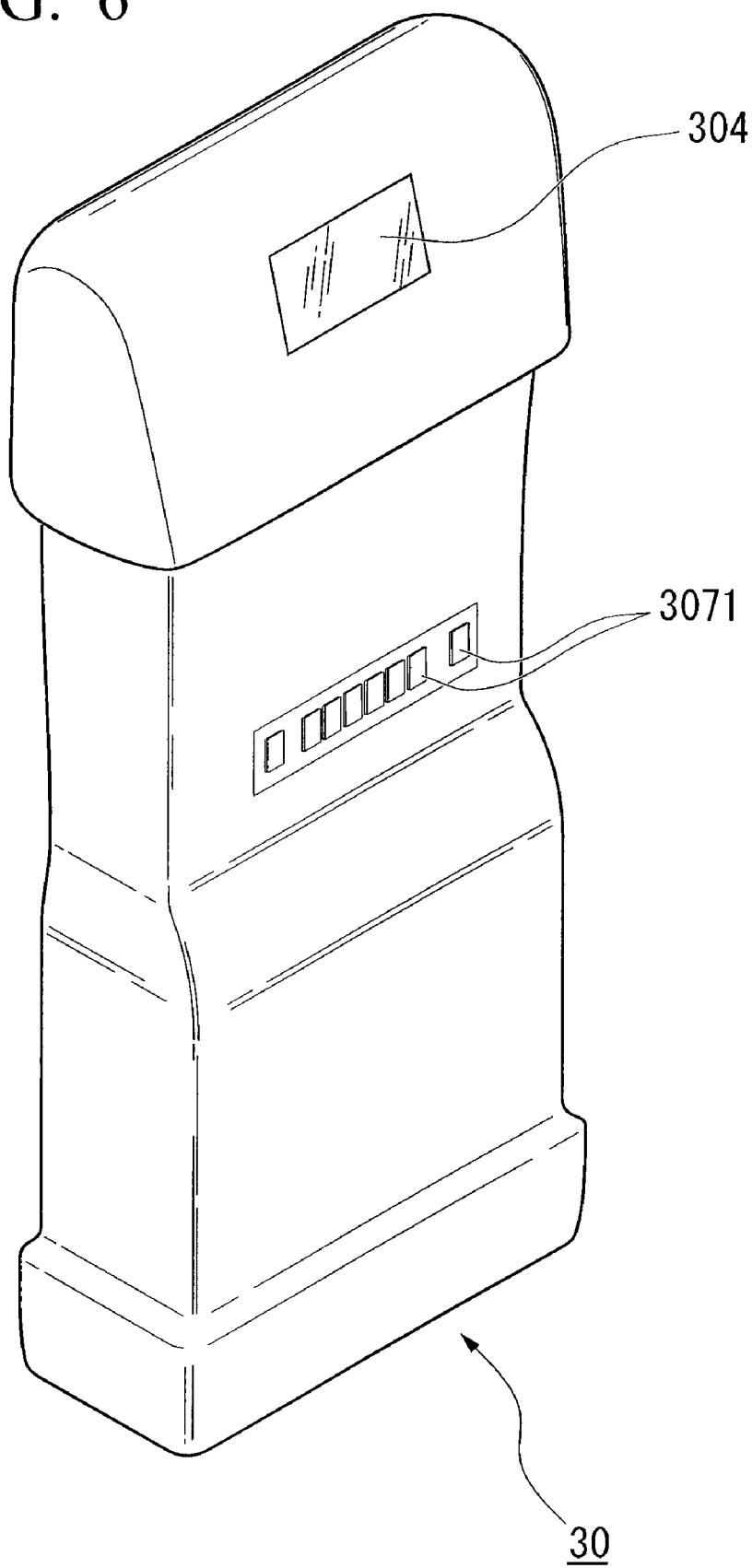
FIG. 6 is a bottom-side external view of the handy terminal of FIG. 4.

FIG. 4 is a block diagram of the configuration of a handy terminal 30. FIG. 5 is a top-side external view and FIG. 6 is a bottom-side external view of the same handy terminal 30. The top side is the face where a display 305 is provided, and the bottom side is a face on the side opposite thereto.

A CPU 301 (control section) is a central processing unit that controls operations of the handy terminal 30 by reading and executing a program stored in a ROM 302. The ROM 302 is a read-only memory that stores the program. A RAM 303 (storage section) is a read/write memory for use as an area for temporarily storing data and the like summoned by the CPU 301 in order to operate, and for storing data such as commodity master data acquired by the store controller 10 and commodity barcodes read by the scanner unit 304.

The scanner unit 304 (reader) reads barcodes appended to commodity, and converts the information of each barcode it reads to a predetermined format before outputting it. As shown in FIG. 6, the scanner unit 304 is provided on the bottom-side face of the handy terminal 30, and executes a reading operation when a barcode is positioned close to the scanner unit 304. Data outputted from the scanner unit 304 when a barcode is read by the customer's operation is sent to the RAM 303 as data for identifying commodity-for-purchase, and is stored in the RAM 303.

The display 305 (display section) displays an individual commodity name and price of commodity whose barcode was read by the scanner unit 304, a list and total price of all read commodities, the number of purchases, and other messages (e.g. display of instructions for a customer who does not understand how to use the handy terminal 30). An LED light-emitting unit 305a is provided at the top-side center of the display 305. The purpose of the LED light-emitting unit 305a is to flash so as to notify a customer as to which one of the handy terminals 30 mounted on the plurality of customer cradles 40 he should use, and it is made to flash when membership number data is received from the membership card reader 50.

An operating unit 306 includes various keys for operating the handy terminal 30, and, as shown in FIG. 5, has a scanner key 3061 for starting reading of a barcode, a correction key 3062 for deleting commodities whose barcodes were read one by one and amending the amount of the commodities, a delete key 3063 for deleting all commodities that were read, a plus (+) key 3064 and a minus (−) key 3065 for specifying a numerical quantity of commodity for purchase, up-and-down arrow keys 3066 for moving a cursor up and down when selecting commodities in a display list of all commodities that were read, and a select key 3067 for selecting an input operation.

A communication unit 307 controls data communication between the register cradle 21 and the customer cradle 40. Specifically, when the handy terminal 30 is connected to the register cradle 21, the communication unit 307 transmits data relating to commodity-for-purchase (data read from the barcodes of the commodity by the scanner unit 304) stored in the RAM 303 to the POS register 20 via the register cradle 21, and, when the handy terminal 30 is connected to the customer cradle 40, the communication unit 307 receives the latest commodity master data and membership number data transmitted from the store controller 10. Commodity-for-purchase data stored in the RAM 303 is deleted when the handy terminal 30 is connected to a customer cradle 40, so that no commodity-for-purchase data is being stored when a customer subsequently uses the handy terminal 30. These data communications are performed based on the aforementioned RS-232C communication protocol.

As shown in FIG. 6, the handy terminal 30 is electrically connected to the register cradle 21 and to the customer cradle 40 by a connection terminal 3071 on a bottom-side face of the handy terminal 30. In addition to the data communications mentioned above, the connection terminal 3071 is also used to charge a chargeable battery 310 when connected to the customer cradle 40.

A buzzer 308 generates a buzzing sound when, from among the plurality of handy terminals 30 mounted on the customer cradle 40, a handy terminal 30 whose LED light-emitting unit 305a is flashing is removed from the customer cradle 40.

While the handy terminal 30 is connected to the customer cradle 40, a battery controller 309 controls the charge to the chargeable battery 310 with power supplied from the customer cradle 40. The chargeable battery 310 supplies power for operating all units of the handy terminal 30.

Figure 7:
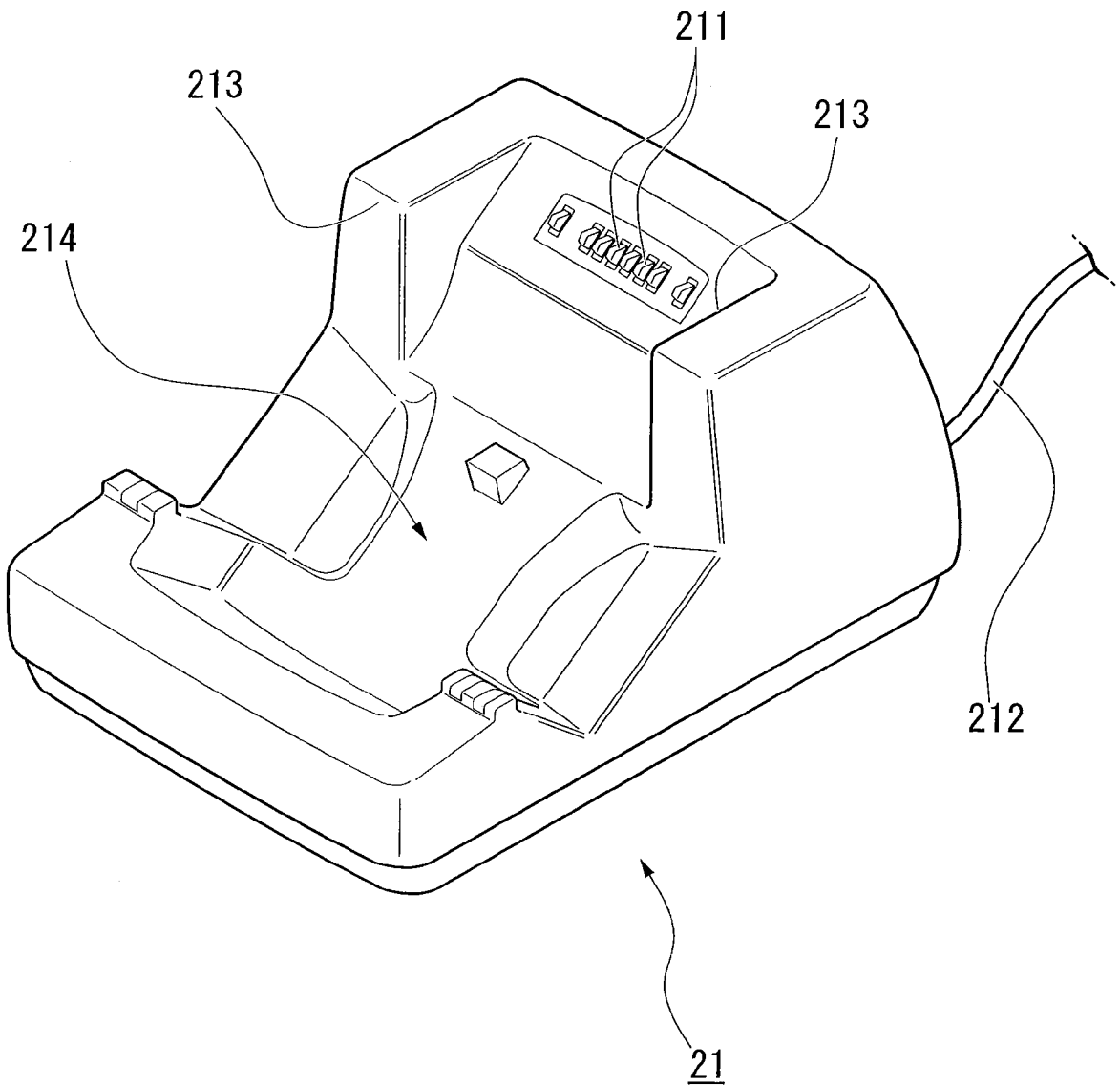
FIG. 7 is an external view of register cradle in the commodity sale processing system of FIG. 1.

FIG. 7 is an external view of the register cradle 21. A connection terminal 211 is provided on a top face of the register cradle 21 (right side of FIG. 7), and connects to the connection terminal 3071 of the handy terminal 30. When the connection terminal 3071 of the handy terminal 30 is connected to this connection terminal 211, the handy terminal 30 is prepared for performing data communication with the POS register 20 while data is transmitted through the register cradle 21, the connection cable 212 of the register cradle 21, and the connection connector 20a of the POS register 20 in this order.

In the register cradle 21, the connection terminal 211 has enbankments 213 on its left and right sides, and has recesses 214 at points forming right-angles with the enbankments 213. The handy terminal 30 is set in the register cradle 21 by fitting it into these enbankments 213 and recesses 214. That is, in mounting the handy terminal 30 on the register cradle 21, the enbankments 213 and the recesses 214 function as guide parts for guiding the handy terminal 30 to a predetermined position, thereby ensuring proper contact and electrical connection between the connection terminal 3071 of the handy terminal 30 and the connection terminal 211 of the register cradle 21.

As shown in FIG. 7, a power lamp, a communication lamp (indicating that communication is being executed between the handy terminal 30 and the POS register 20), an error lamp (indicating that a communication error has occurred), and so on, are provided on lower side faces of the register cradle 21

Figure 8:
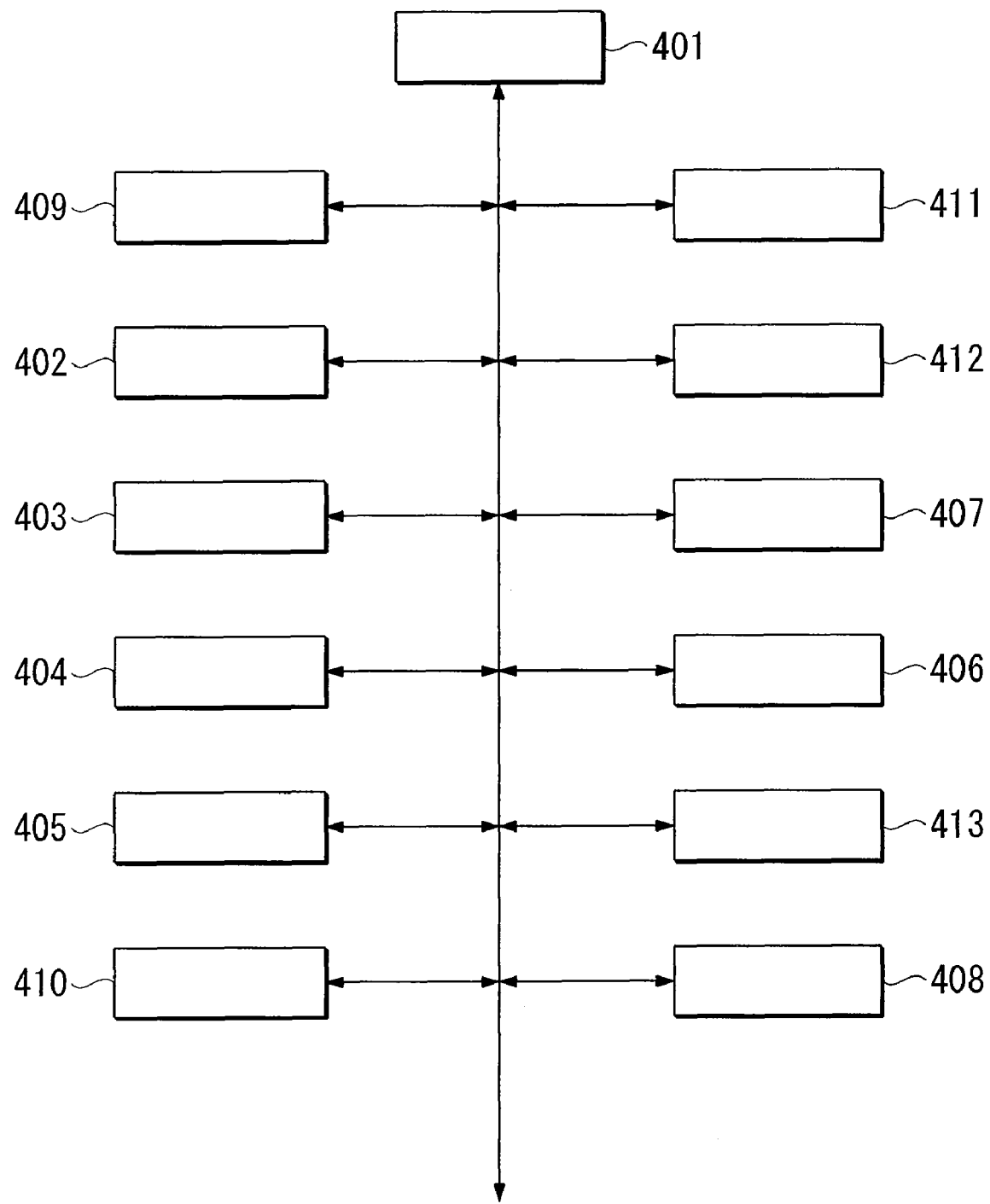
FIG. 8 is a block diagram of the configuration of a POS register in the commodity sale processing system of FIG. 1.

FIG. 8 is a block diagram of the configuration of the POS register 20 according to the present embodiment. A CPU 401 (control section) is a central processing unit that controls operations of the POS register 20 by reading and executing a program stored in a ROM 402. The ROM 402 is a read-only memory that stores the program. A RAM 403 (storage unit) is a random-access memory that stores data such as commodity master data acquired by the store controller 10 and registration commodity files acquired by the handy terminal 30.

A scanner unit 404 (code reader) reads barcodes attached to commodities, converting information from the read barcodes to a predetermined format and outputting it.

The scanner unit 404 includes connection connectors 20a and 20b of FIG. 1, and the connection connector 20a reads commodity-for-purchase information stored in the handy terminal 30 via the register cradle, and the connection connector 20b is connected by an employee using a predetermined cable to a barcode scanner that reads commodity barcodes. Data inputted from either one of the connection connectors is sent to be stored as data for identifying commodity-for-purchase to the RAM 4, which functions as a registered information storage unit.

A liquid crystal touch-panel unit 405 (display section) displays information intended for employees, such as registered commodity files. The touch-panel allows information to be inputted, not just displayed.

An operating unit 406 includes various keys for operating the POS register 20. A communication unit 407 communicates with the handy terminal 30 on the LAN 60 via the store controller 10 and the register cradle 21. A buzzer 408 generates a buzzing sound when an operation confirmation is required etc. After checkout processing ends, a hard disk 409 stores purchase information stored in the RAM 403 as purchase result data. A display for customer 410 displays information for the customer, such as prices of commodities, total price, and change received. A receipt printer 411 prints a receipt. A drawer unit 412 stores cash, vouchers, and such like. When a customer wishes to pay by credit card, a card-reader 413 reads information of the credit card for completing checkout.

Subsequently, an operation (process of CPU 301) of the handy terminal 30 in this embodiment will be explained based on the flowchart of FIG. 9.

(Step S101) A customer puts commodities he or she wishes to purchase in the basket. The customer also registers information of the commodities he or she wishes to purchase by operating the handy terminal 30. Specifically, the customer operates the handy terminal 30, and uses the scanner unit 304 to make the handy terminal 30 read a barcode attached to the commodity. When the CPU 301 of the handy terminal 30 determines that the first digit of the information in the code contained in the barcode read by the scanner unit 304 is, for example, 1, it stores the code that was read as commodity-for-purchase information in a commodity-for-purchase information area of the RAM 303. The flowchart then proceeds to Step S102.

(Step S102) After the customer has completed registration of the commodities he or she wishes to purchase using the handy terminal 30, he or she gives the handy terminal 30 that registered the commodity information and the basket containing the commodity he or she wishes to purchase to a register operator (store employee). The register operator manipulates the handy terminal 30 he or she received from the customer, and makes it read his or her own employee barcode. For example, his or her or her employee barcode is attached to his or her name tag.

Specifically, the register operator manipulates the handy terminal 30, and uses the scanner unit 304 to make the handy terminal 30 read a barcode attached to his or her name tag. When the first digit of information in the code contained in the barcode read by the scanner unit 304 is, for example, 9, the CPU 301 of the handy terminal 30 determines that employee information has been read, and executes processes in commodity-for-purchase confirmation mode (scheme). The processes in commodity-for-purchase confirmation mode are the processes from Step S103 to Step S108 described below. Then, the flowchart proceeds to Step S103.

(Step S103) The register operator selects one of the items of commodities from the basket received from the customer and makes the handy terminal 30 read a barcode attached to it. For example, he or she selects the most expensive item of commodities from the basket, and makes the handy terminal 30 read the barcode of that item.

Specifically, the register operator manipulates the handy terminal 30, and uses the scanner unit 304 to make the handy terminal 30 read the barcode attached to the selected commodity. Then, the flowchart proceeds to Step S104.

(Step S104) The CPU 301 of the handy terminal 30 determines whether a commodity code contained in the barcode that was read in Step S103 is contained in the commodity-for-purchase information registered in the RAM 303 in Step S101. When the CPU 301 determines that the commodity code contained in the barcode read in Step S103 is contained in the commodity-for-purchase information registered in the RAM 303 in Step S101, the flowchart proceeds to Step S105, and otherwise proceeds to Step S109. The CPU 301 controls to ensure that the commodity code of the barcode that was read is not added to the commodity-for-purchase information area of the RAM 303. That is, it simply determines whether the code that was read is contained in the commodity-for-purchase information area of the RAM 303. This eliminates the need to delete commodity that was scanned for confirmation after it is confirmed.

(Step S105) The CPU 301 of the handy terminal 30 displays 'o' on the display 305. This enables the register operator to ascertain that the commodity information read in Step S103 was correctly registered in the RAM 303 in Step S101. Then, the flowchart proceeds to Step S106.

Figure 10:
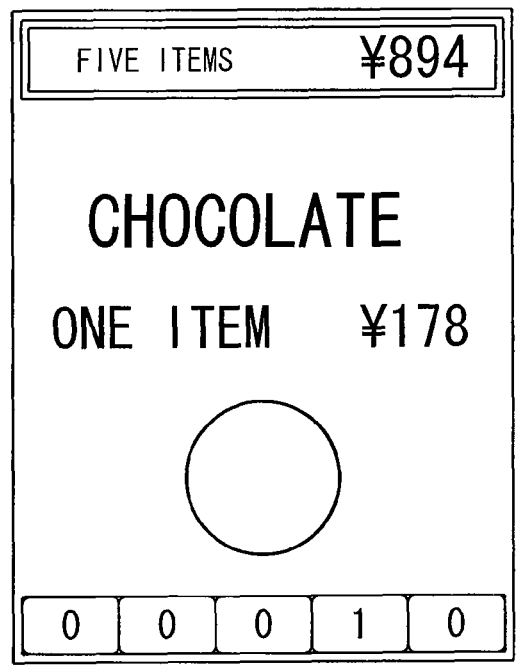
FIG. 10 is an example of a screen displayed on a display of the handy terminal in the embodiment.

FIG. 10 is an example of a screen displayed on the display 305 in Step S105. In the example shown in this drawing, subtotal information is displayed in a top part of the screen. Subtotal information indicates the number of items of commodity-for-purchase information and their total price. In the example shown in the drawing, the number of items of commodity-for-purchase is '5', and the price is '¥894'. The name of the commodity and its price are taken from the commodity information contained in the barcode obtained in Step S103, and are displayed below the subtotal information. Here the commodity name is 'Chocolate' and its price is '¥178'. The number of the item(s) is displayed on the left of the price. In this example, the number is 'one'. Furthermore, 'o' is displayed below the price. This enables the register operator to ascertain that the commodity information read in Step S103 was correctly registered in the RAM 303 in Step S101.

(Step S106) To check another item of commodity, the register operator continues by removing it from the basket and reading the barcode attached to it. If not checking another item of commodity, he or she places the handy terminal 30 in the register cradle. If another commodity code is inputted to the CPU 301 of the handy terminal 30, the CPU 301 determines that another item of commodity will be checked, and returns to Step S103; otherwise the flowchart proceeds to Step S107.

(Step S107) The register operator places the handy terminal 30 in the register cradle 21 connected to the POS register 20. When the handy terminal 30 is connected to the register cradle 21, the CPU 301 of the handy terminal 30 confirms the electrical connection to the register cradle, and transmits commodity codes of the commodity-for-purchase stored in the commodity-for-purchase information area of the RAM 303 via the register cradle 21 to the POS register 20. When the handy terminal 30 is placed in the register cradle 21 and the last commodity-for-purchase information data is transmitted, the CPU 301 changes from commodity-for-purchase confirmation mode to commodity registration mode, whereby no mode-switch operation is required, and operability is increased. The flowchart then proceeds to Step S108.

Incidentally, a key (not shown) for ending commodity-for-purchase confirmation mode and returning to commodity registration mode may be displayed on the display 305 of the handy terminal 30, and, when the handy terminal 30 is connected to the register cradle 21 after selecting this key, commodity codes of the commodity-for-purchase may be then transmitted to the POS register 20.

(Step S108) The POS register 20 executes a checkout process based on the commodity-for-purchase information transmitted from the handy terminal 30. Then, the process ends.

(Step S109) The CPU 301 of the handy terminal 30 displays 'x' on the display 305. This enables the register operator to ascertain that the commodity information read in Step S103 was not correctly registered in the RAM 303 in Step S101. The flowchart then proceeds to Step S110.

Figure 11:
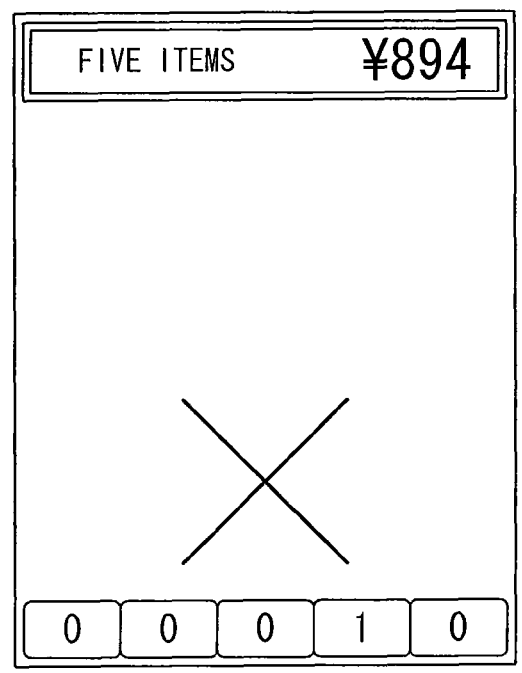
FIG. 11 is an example of a screen displayed on a display of the handy terminal in the embodiment.

FIG. 11 is an example of a screen displayed on the display 305 in Step S109. In the example shown in this drawing, subtotal information is displayed in a top part of the screen. Subtotal information indicates the number of items of commodity-for-purchase information and their total price. In the example shown in this drawing, the number of items of commodity-for-purchase is '5', and the price is '¥894'. Also, 'x' is displayed below the price. This enables the register operator to ascertain that the commodity information read in Step S103 was not correctly registered in the RAM 303 in Step S101.

(Step S110) Having ascertained in Step S109 that the commodity information is not correctly registered in the handy terminal 30, the register operator does not use the commodity information registered in the handy terminal 30, and instead uses a scanner, which is connected to the connection connector 20b of the POS register 20, to read the barcodes of all commodity in the basket received from the customer in Step S102 and register information contained in those barcodes in the POS register 20. The POS register 20 executes a checkout process based on the information contained in the barcodes read by the scanner. Then, the process ends.

When the processes from Step S101 to Step S110 have ended, the employee returns the handy terminal 30 used in those processes to the customer cradle 40. When the handy terminal 30 is returned to the customer cradle 40, the commodity-for-purchase information stored in the RAM 303 of the handy terminal 30 is deleted.

As described above, according to this embodiment, since it is possible to inform the customer that confirmation is being made regarding whether the commodity-for-purchase information he or she registered correctly contains information relating to the commodity he or she is purchasing, an effect can be obtained that incorrect registration is suppressed. Further, since the confirmation concerns a portion of the commodity-for-purchase, confirmation can be made without increasing the time required for checkout.

Figure 9:
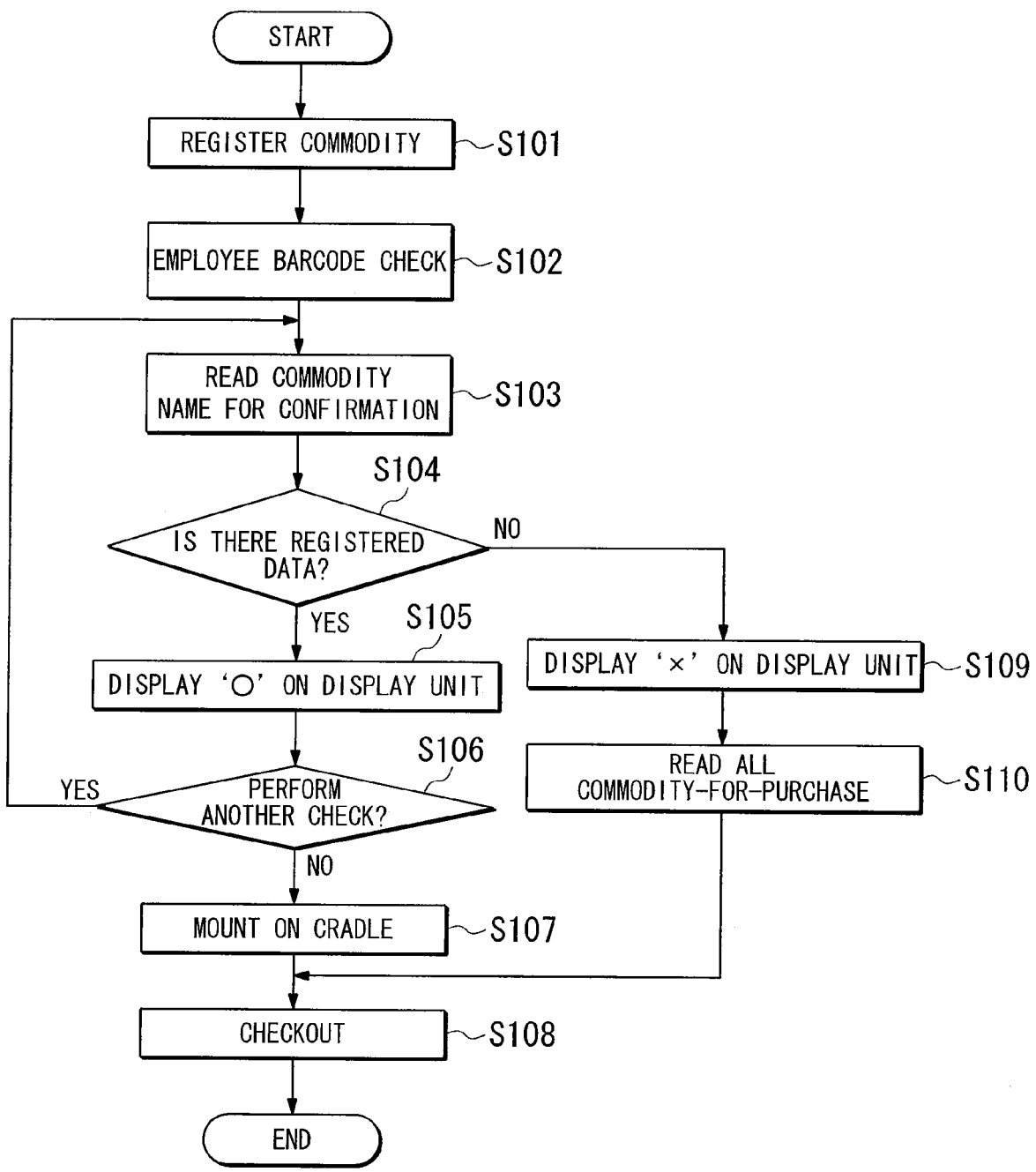
FIG. 9 is a flowchart of an operation of the handy terminal in the embodiment.

While in the example described using FIG. 9, commodity-for-purchase information is confirmed before transmitting it to the POS register, the commodity-for-purchase information can be confirmed after transmission to the POS register.

Figure 12:
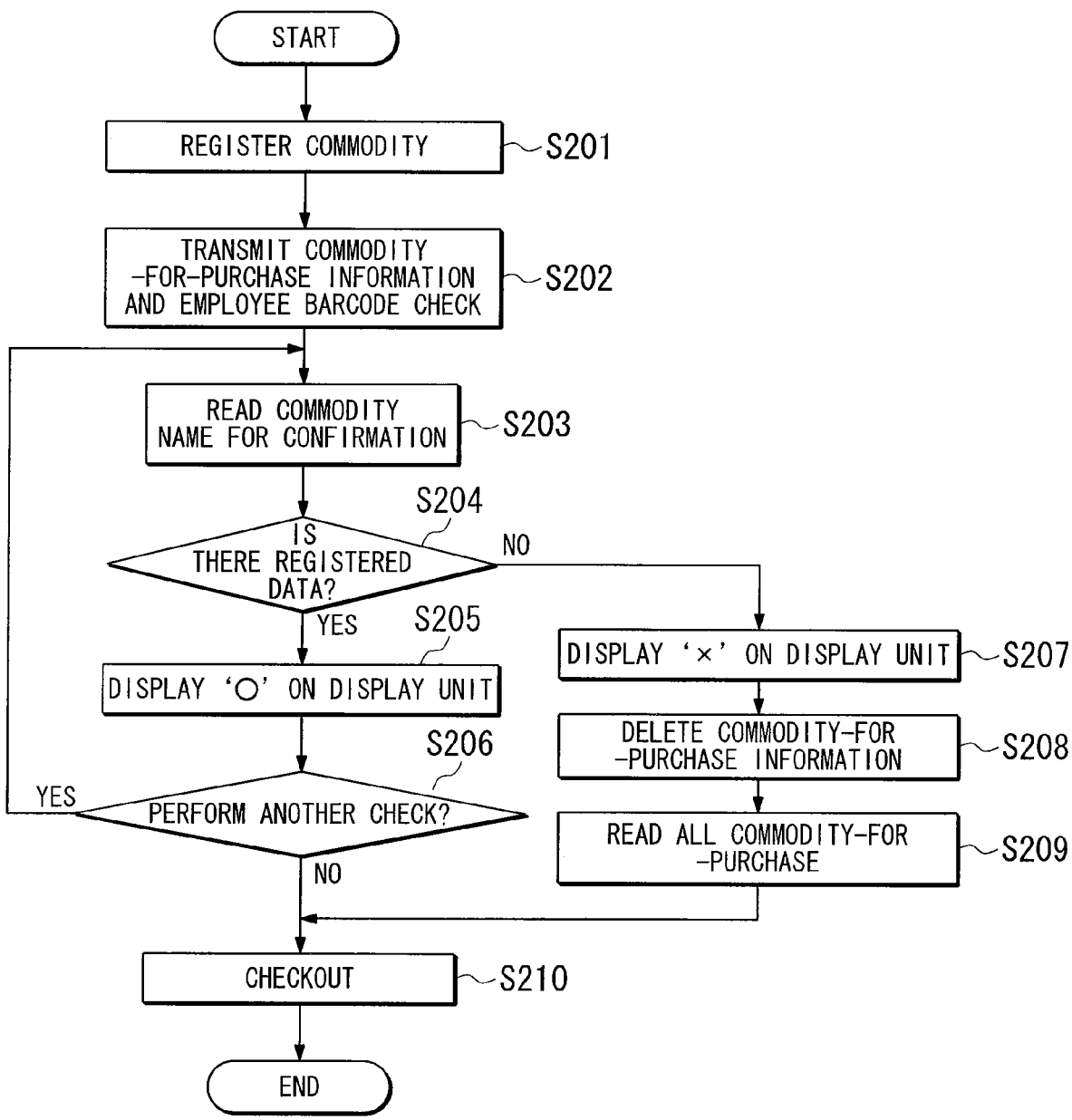
FIG. 12 is a flowchart of a procedure for confirming commodity-for-purchase information after the commodity-for-purchase information is transmitted to the POS register in the embodiment.

FIG. 12 is a flowchart of a procedure for confirming commodity-for-purchase information after transmitting the commodity-for-purchase information to the POS register 20.

(Step S201) The customer places commodities he or she wishes to purchase in the basket. The customer also registers information of the commodities he or she wishes to purchase by operating the handy terminal 30. Specifically, he or she operates the handy terminal 30, and, using the scanner unit 304, makes the handy terminal 30 read a barcode attached to the commodity. When the CPU 301 of the handy terminal 30 determines that the first digit of the information in the code contained in the barcode read by the scanner unit 304 is, for example, 1, the CPU 301 stores the code that was read as commodity-for-purchase information in a commodity-for-purchase information area of the RAM 303. The CPU 301 then proceeds to Step S202.

(Step S202) After the customer has completed registration of the commodities he or she wishes to purchase in the handy terminal 30, he or she gives the handy terminal 30 that registered the commodity information and the basket containing the commodities he or she wishes to purchase to a register operator (store employee). The register operator places the handy terminal 30 in the register cradle 21 that is connected to the POS register 20. When the handy terminal 30 is connected to the register cradle 21, the CPU 301 of the handy terminal 30 confirms the electrical connection to the register cradle, and transmits commodity codes of the commodity-for-purchase stored in the commodity-for-purchase information area of the RAM 303 via the register cradle 21 to the POS register 20. The POS register 20 receives the commodity code of the commodity-for-purchase, and stores it in the RAM 403. The register operator also makes the POS register 20 read his or her own employee barcode. For example, his or her employee barcode is attached to his or her name tag.

Specifically, the register operator manipulates the barcode scanner that is connected to the POS register 20 and makes the POS register 20 read the barcode attached to his or her name tag. When the first digit of information in the code contained in the barcode read by the barcode scanner is, for example, 9, a CPU 301 of the POS register 20 determines that employee information has been read, and executes processes in commodity-for-purchase confirmation mode (scheme). Processes in commodity-for-purchase confirmation mode are the processes from Step S203 to Step S209 described below. The flowchart then proceeds to Step S203.

(Step S203) The register operator selects one of the items of commodities from the basket received from the customer, and makes the barcode scanner connected to the POS register 20 read a barcode attached to it. For example, he or she selects the most expensive item of commodity from the basket, and makes the barcode scanner connected to the POS register 20 read the barcode attached to that item.

Specifically, the register operator manipulates the barcode scanner connected to the POS register 20 and makes the barcode scanner read the barcode attached to the selected commodity. The flowchart then proceeds to Step S204.

(Step S204) The CPU 301 of the POS register 20 determines whether a commodity code contained in the barcode that was read in Step S203 is contained in the commodity-for-purchase information transmitted from the handy terminal 30 in Step S202. When the CPU 301 of the POS register 20 determines that the commodity code contained in the barcode read in Step S203 is contained in the commodity-for-purchase information transmitted from the handy terminal 30 in Step S202 and stored in the RAM 403, the flowchart proceeds to Step S205, and otherwise proceeds to Step S207. The CPU 301 of the POS register 20 controls to ensure that the commodity code of the barcode that was read is not added to the commodity-for-purchase information. That is, it simply determines whether the code that was read is contained in the commodity-for-purchase information area that was transmitted from the handy terminal 30 in Step S202. This eliminates the need to delete commodity that was scanned for confirmation after it is confirmed.

(Step S205) The CPU 301 of the POS register 20 displays 'o' on the display of the POS register 20. This enables the register operator to ascertain that the commodity information read in Step S203 was correctly registered in the commodity-for-purchase information transmitted from the handy terminal 30 in Step S202. The flowchart then proceeds to Step S206.

(Step S206) When checking another item of commodity, the register operator continues by removing it from the basket and reading the barcode attached to it. If not checking another item of commodity, he or she presses the subtotal and the deposit/case key, and performs a checkout process based on the commodity-for-purchase information stored in the RAM 403 in Step S202. The flowchart having read the barcode subsequently returns to Step S203, and otherwise proceeds to Step S210.

(Step S207) The CPU 301 of the POS register 20 displays 'x' on the display of the POS register 20. This enables the register operator to ascertain that the commodity information read in Step S203 is not correctly registered in commodity-for-purchase information transmitted from the handy terminal 30 in Step S202. The flowchart then proceeds to Step S208.

(Step S208) Since based on the process of Step S207, the register operator knows that there is an error in the commodity-for-purchase information received in Step S202, he or she deletes the commodity-for-purchase information received in Step S202. The flowchart then proceeds to Step S209.

(Step S209) The register operator uses the scanner unit of the POS register 20 to read barcodes of all the commodities in the basket received from the customer in Step S202, and registers the information contained in the barcodes in the POS register 20.

Based on the information contained in the barcodes read by the scanner unit, the POS register 20 performs a checkout process. The flowchart then ends the process.

(Step S210) Based on the commodity-for-purchase information transmitted from the handy terminal 30 in Step S202, the POS register 20 performs a checkout process. The flowchart then ends the process.

While in the example described using FIG. 9, the register operator arbitrarily selects one item or a plurality of items of commodities from the basket, and confirms the commodity-for-purchase, to make it easier for him to select commodities for confirmation, a display (display of indicator information) can be provided as an indicator for selecting commodities for confirmation. In this case, the RAM 303 of the handy terminal 30 stores a commodity file beforehand.

Figure 13:
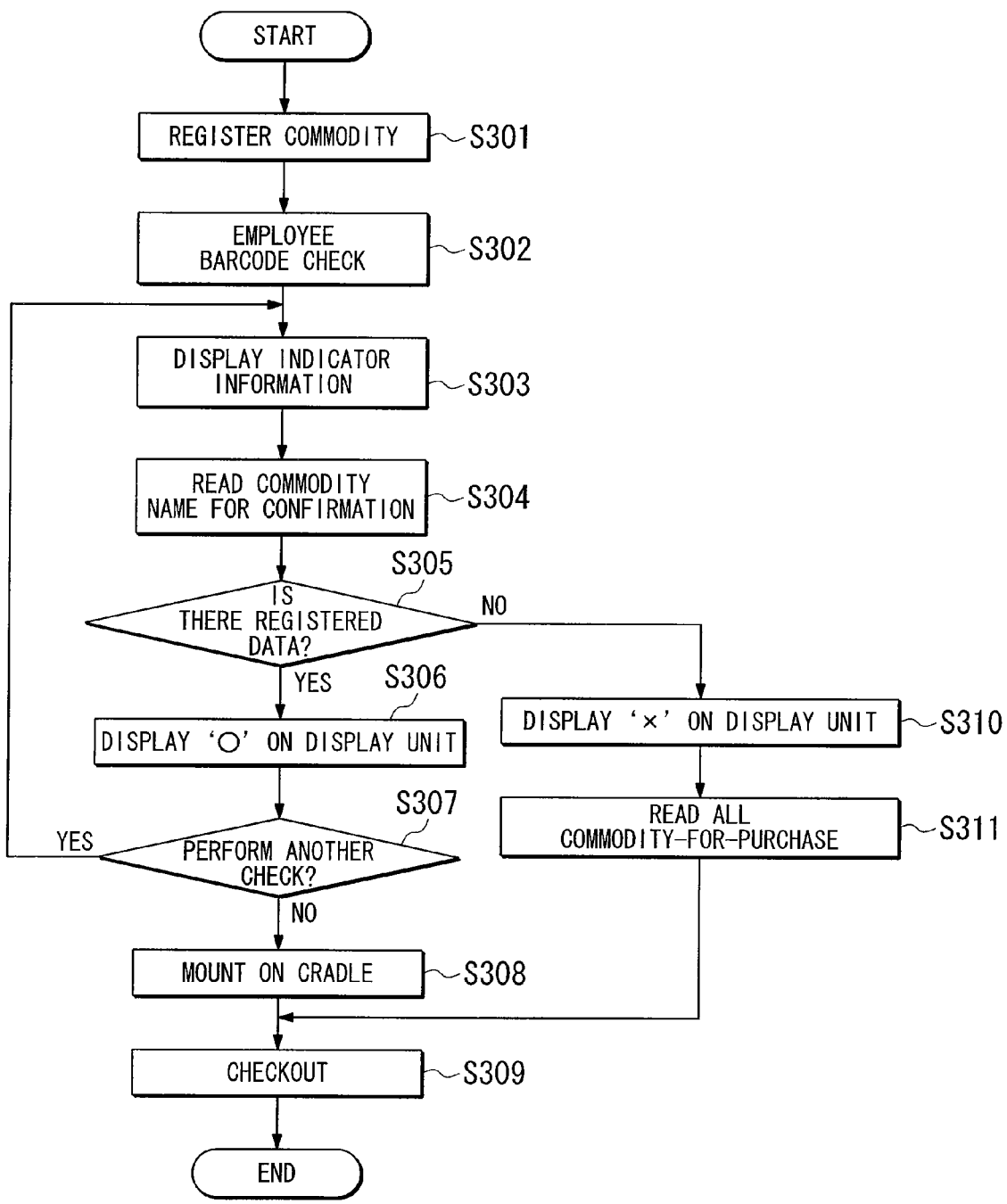
FIG. 13 is a flowchart of a procedure for confirming commodity-for-purchase information when displaying indicator information in the embodiment.

FIG. 13 is a flowchart of a procedure for confirming commodity-for-purchase information when displaying indicator information.

(Step S301) The customer puts commodity he or she wishes to purchase in the basket. The customer also registers information of the commodity he or she wishes to purchase by operating the handy terminal 30. Specifically, the customer operates the handy terminal 30, and uses the scanner unit 304 to make the handy terminal 30 read a barcode attached to the commodity. When the CPU 301 of the handy terminal 30 determines that the first digit of the information in the code contained in the barcode read by the scanner unit 304 is, for example, 1, it stores the code that was read as commodity-for-purchase information in a commodity-for-purchase information area of the RAM 303. The flowchart then proceeds to Step S302.

(Step S302) After the customer has completed registration of the commodity he or she wishes to purchase in the handy terminal 30, he or she gives the handy terminal 30 that registered the commodity information and the basket containing the commodities he or she wishes to purchase to a register operator (store employee). The register operator manipulates the handy terminal 30 he or she received from the customer, and makes it read his or her own employee barcode. For example, his or her employee barcode is attached to his or her name tag.

Specifically, the register operator manipulates the handy terminal 30, and uses the scanner unit 304 to make the handy terminal 30 read a barcode attached to his or her name tag. When the first digit of information in the code contained in the barcode read by the scanner unit 304 is, for example, 9, the CPU 301 of the handy terminal 30 determines that employee information has been read, and executes processes in commodity-for-purchase confirmation mode (scheme). Processes in commodity-for-purchase confirmation mode are the processes from Step S303 to Step S308 described below. The flowchart then proceeds to Step S303.

The CPU 301 of the handy terminal 30 displays indicator information of the display 305. The flowchart then proceeds to Step S304. Specifically, based on the commodity-for-purchase information stored in the commodity-for-purchase information area of the RAM 303 in Step S301, and on the commodity file stored beforehand in the RAM 303, the CPU 301 of the handy terminal 30 displays the name of the most expensive item of commodity among those in the commodity-for-purchase information.

Processes from Step S304 to Step S311 are the same as those from Step S103 to Step S110 in FIG. 9.

As described above, indicator information can be displayed on the display 305 of the handy terminal 30. This enables the register operator to ascertain immediately the commodities to be confirmed, and to perform the checkout process speedily.

Figure 14:
FIG. 14 is an example of a screen displayed on a display of the handy terminal in the embodiment.

FIG. 14 is an example of indicator information displayed on the display of a handy terminal in this embodiment. In the example shown in this drawing, subtotal information is displayed in the top part of the screen. The subtotal information indicates the number of items of commodities-for-purchase information and their total price. In the example shown in this drawing, the number of items of commodity-for-purchase is '5', and the price is '¥3845'. The indicator information displayed in the process of Step S303 is displayed below the subtotal. In the example shown in this drawing, the indicator information is 'Confirm "oo domestic grand beef steak" ¥1500'. Thus the register operator can ascertain that the commodity to be confirmed is "oo domestic brand beef steak"

While in Step S303 the name of the most expensive item of commodity is used as indicator information, names of a plurality of items, such as the three most expensive items, can be used instead. Specifically, the name of the most expensive item of commodity is displayed first as indicator information on the display 305. When that item has been confirmed, in Step S307 the procedure returns to Step S303, and the name of the second most expensive item of commodity is displayed as indicator information on the display 305. The processes from Step S303 to Step S307 are similarly repeated for the determined number of items of commodities.

Furthermore, while in Step S303 the name of the most expensive item of commodity is used as the indicator information, for each item of commodity in the commodity file, a flag can be inserted to identify whether it is a confirmation target, and, when an item of commodity with a raised flag is registered, the name of that item is displayed as indicator information on the display 305.

For example, items of commodities that are similar in appearance, making it difficult to judge at one glance whether they are correctly registered, can be flagged as targets for confirmation. Specifically, since wines of different types are sold in similarly-shaped bottles, it is difficult to judge from its appearance whether a bottle of wine is cheap or expensive. Therefore, flags can be raised for all wines, and, when a wine is registered in the commodity-for-purchase information, the name of the registered wine can be displayed as indicator information on the display 305.

Figure 15:
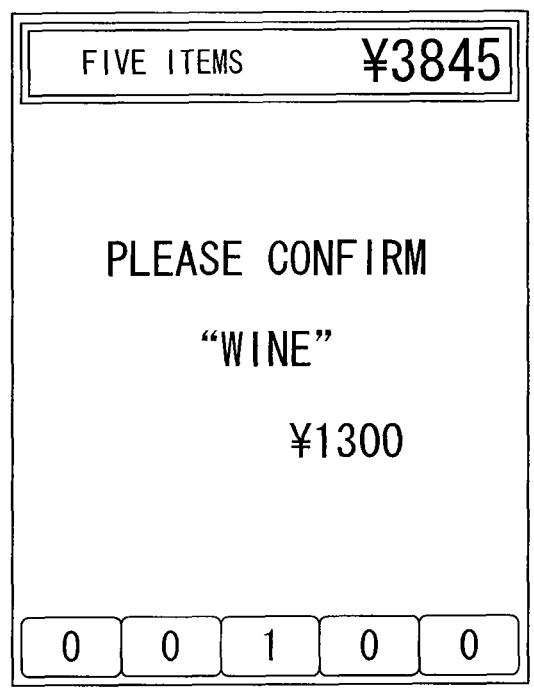
FIG. 15 is an example of a screen displayed on a display of the handy terminal in the embodiment.

FIG. 15 shows an example of indicator information displayed on the display of a handy terminal in this embodiment. In the example shown in this drawing, subtotal information is displayed in the top part of the screen. Subtotal information indicates the number of items of commodity-for-purchase information and their total price. In the example shown in this drawing, the number of items of commodity-for-purchase is '5', and the price is '¥3845'. The indicator information displayed in the process of Step S303 is displayed below the subtotal information. In the example shown in this drawing, the indicator information is 'Confirm "Wine" ¥1300'. Thus the register operator can ascertain that the commodity to be confirmed is "Wine".

While in Step S303 the name of the most expensive item of commodity is used as indicator information, the number of items corresponding to a predetermined proportion of those registered in the commodity-for-purchase information can be displayed as indicator information on the display 305.

Specifically, when the number of items of commodities registered in the commodity-for-purchase information is 20, and 20% of the commodity is displayed as indicator information, after the process of Step S302, the CPU 301 of the handy terminal 30 calculates '4' as the number of items of commodities for confirmation, and stores the calculated number as 'Number of Confirmations' in the RAM 303. Incidentally, when the number of confirmations is not a whole number, the digits after the decimal point are discarded.

The CPU 301 subtracts 1 from the 'Number of Confirmations' every time it executes the process of Step S303. In Step S307, when the CPU 301 determines that the 'Number of Confirmations' is 1 or greater, the flowchart returns to Step S303; otherwise, the flowchart proceeds to Step S308. Thus the number of items of commodities calculated as the number of confirmations can be displayed on the display 305 as indicator information. When the number of confirmations is calculated, a message containing that number may also be displayed on the display 305.

Figure 16:
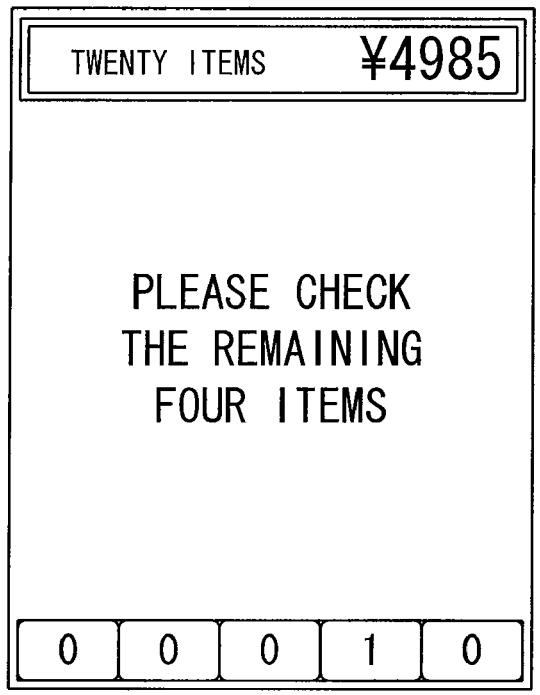
FIG. 16 is an example of a screen displayed on a display of the handy terminal in the embodiment.

FIG. 16 shows an example of the number of confirmations displayed on a display of a handy terminal according to this embodiment. In the example shown in this drawing, subtotal information is displayed in the top part of the screen. Subtotal information indicates the number of items of commodities-for-purchase information and their total price. In the example shown in this drawing, the number of items of commodities-for-purchase is '20', and the price is '¥4985'. A message containing the number of confirmations is displayed below the subtotal information. In the example shown in this drawing, the message is: 'Please check the remaining four items'. This enables the register operator to ascertain that there are four items of commodities still to be confirmed.

In the display procedure of the indicator information shown in FIG. 13, while here commodity is confirmed using the handy terminal 30, instead of confirming it with the handy terminal 30, commodity to be confirmed can simply be displayed on the display 305. That is, it is acceptable simply to display indicator information on the display 305 of the handy terminal 30. An operating key for displaying indicator information may be provided on the handy terminal 30. The matter as to whether to confirm the commodity using the handy terminal 30 or to display only indicator information on the handy terminal 30 is confirmed after the customer has registered the commodity, the difference being merely whether the handy terminal 30 makes the determination or an employee makes the determination, the objectives and techniques being the same.

Figure 17:
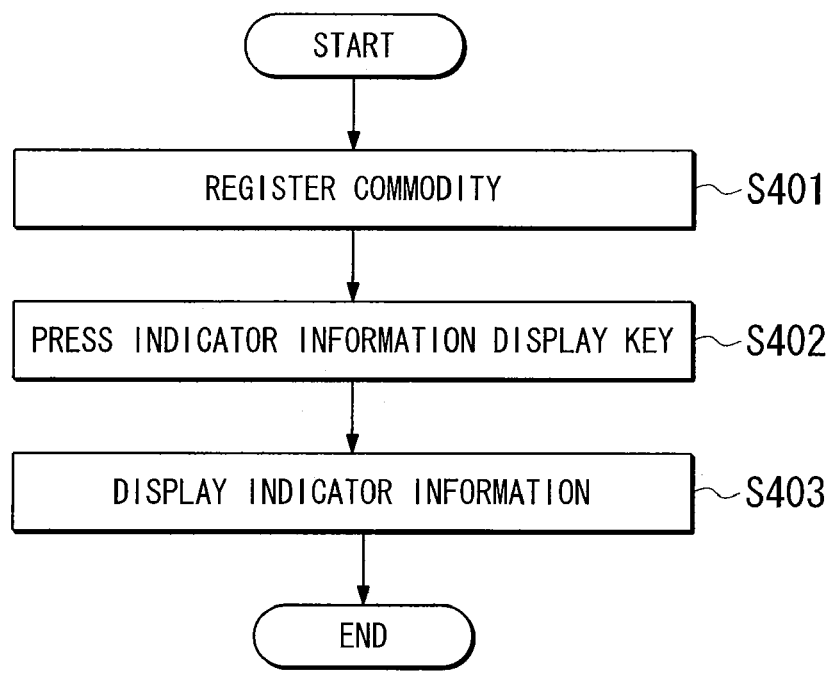
FIG. 17 is a flowchart of a procedure for displaying indicator information on a display of the handy terminal in the embodiment.

FIG. 17 is a flowchart of a procedure for displaying indicator information on a display of a handy terminal.

(Step S401) A customer puts commodities he or she wishes to purchase in the basket. He or she also registers information of the commodities he or she wishes to purchase by operating the handy terminal 30. Specifically, the customer operates the handy terminal 30, and uses the scanner unit 304 to make the handy terminal 30 read a barcode attached to the commodity. When the CPU 301 of the handy terminal 30 determines that the first digit of the information in the code contained in the barcode read by the scanner unit 304 is, for example, 1, it stores the code that was read as commodity-for-purchase information in a commodity-for-purchase information area of the RAM 303. The flowchart then proceeds to Step S402.

(Step S402) After the customer completes registration of the commodities he or she wishes to purchase using the handy terminal 30, he or she gives the handy terminal 30 that registered the commodity information and the basket containing the commodities he or she wishes to purchase to a register operator (employee). The register operator presses the indicator information display key (not shown) on the handy terminal 30 he or she received from the customer. The flowchart then proceeds to Step S403.

(Step S403) The CPU 301 of the handy terminal 30 displays commodities to be confirmed on the display 305, from among commodity-for-purchase information stored in the commodity-for-purchase information area of the RAM 303 in Step S401. The flowchart then ends the process.

While in the example shown with reference to FIG. 17, commodity to be confirmed is displayed on the display 305, an acceptable alternative is to display the most expensive item of commodity among those stored in the commodity-for-purchase information, or to set flags and display the names of items of commodity whose flags are raised on the display 305.

In another adoptable configuration, the mode may change when the handy terminal 30 is mounted on the register cradle 21, and the indicator information is then displayed on the display 305 of the handy terminal 30. Since the register operator no longer needs to read the barcodes of commodities in order to confirm them, he or she can perform confirmation speedily. The register operator visually checks whether the commodity displayed on the display 305 is in the basket. If it is in the basket, he or she cancels the display of the commodity to be confirmed by pressing the display key on the handy terminal 30, places the handy terminal 30 on the register cradle 21, and relays the purchase information to the POS register 20; whereas, if the commodity is not in the basket, he or she does not use the commodity-for-purchase information stored in the RAM 303 of the handy terminal 30, and instead registers each item using the scanner 22.

While in the display procedure of the information providing device shown in FIG. 13, commodity is confirmed using the handy terminal 30, the commodity can be confirmed with the POS register 20 instead of the handy terminal 30. That is, the POS register 20 can be provided with an operating key for switching between a confirmation device, reading with a barcode scanner for commodity registration, and reading for a confirmation device, after commodity information has been transferred to the POS register 20, the operator manipulates the key, uses the barcode scanner connected to the connector 20b to read the barcode attached to the commodity, and determines whether the code information that was read is stored in a registration-information storage device where the transferred commodity information is stored, the result of this determination then being displayed on the display unit of the POS register 20. While a key for switching is provided here, in a case where commodity is not being registered with the POS register 20, a switching device is not provided, and instead the confirmation device is made to execute confirmation as soon as the commodity information is transferred to the POS register 20.

While an embodiment has been described in detail with reference to the drawings, this embodiment is not limiting and can be modified in various ways without departing from its main features.

For example, while in Step S103 in the flowchart shown in FIG. 9 in the embodiment described above, when commodity-for-purchase information was read, control was implemented to ensure that this was not added to the commodity-for-purchase information area, the information can instead be stored separately depending on whether it is commodity registered by a customer or commodity registered for confirmation, and commodity registered for confirmation can then be deleted from the storage unit before mounting the handy terminal on the cradle.

Further, in Step S109 of the flowchart shown in FIG. 9 in the embodiment, when it is determined that an item of commodity that was read is not stored in the commodity-for-purchase information area, the POS register 20 can include a key for declaring that an incorrect registration was made, thereby enabling that member to be identified and stored.

A specific example of this process will be described. Following Step S109 in FIG. 9, when performing checkout process in Step S108, the store employee examines the customer's membership card, and presses a key for declaring that an incorrect registration was made on the POS register before using it to read the membership card. This raises a flag indicating the incorrect registration in the information for that customer stored in a membership file stored in the store controller 10.

The next time that customer visits the store and his or her membership card is read, when he or she removes a handy terminal from a register cradle, the earlier incorrect registration is displayed on the display unit of the handy terminal in a format that is unintelligible to the customer.

Instead of raising a flag, it is acceptable to store a count number that increases every time the key for declaring that an incorrect registration was made is pressed, and display this count number in a corner of the display unit of the handy terminal. The number of confirmation of registered commodity can then be changed in accordance with the number of times that the key for declaring that an incorrect registration was made is pressed; alternatively, for commodity registered by a customer whose key for declaring that an incorrect registration was made has been pressed many times, this commodity is not confirmed, and is instead all registered again by an employee using a POS register in the normal manner.

Further, while in the embodiment, the shift to commodity-for-purchase confirmation mode is made by reading an employee barcode, this is not limitative of the present application; it is acceptable to provide a fix key and a display key for switching between normal commodity registration mode using a handy terminal and commodity-for-purchase confirmation mode, and to switch the mode according to whichever key is selected.

Further, while in the embodiment, only one item of commodities is confirmed, this is not limitative, and a plurality of items among the commodity-for-purchase can be confirmed.

Further, while in the embodiment, the number of confirmations is displayed as indicator information, the displayed number of confirmation can be varied in accordance with the number of items of commodities stored in the commodity-for-purchase information; for example, when there are fewer than ten items of commodity, the number of confirmations is 1, when there are between 10 and 20 items, the number of confirmations is 3, and so on.

Further, while in the embodiment, 'o' is displayed on the display unit of the handy terminal when there was an item commodity in commodity-for-purchase confirmation mode, and 'x', is displayed when there is not, the display method is not limited to 'o' and 'x', it being acceptable to use any pictures and letters that indicate that there is or is not an item of commodity.

In addition, the aforementioned embodiments are not limited to the configuration in which the commodity master is stored in each handy terminal, and the commodity master stored in the handy terminal is referred to when barcode attached to commodity is read, and then the names or the like of the commodity is displayed on the display section of a handy terminal. In another configuration, the commodity masters may be stored in a higher level store controller, and the commodity master stored in the store controller is referred to every time the barcode is read. This applies not only to a visitor's operation for reading the commodity but also to commodity-for-purchase confirmation mode performed by a store employee.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A mobile terminal in a commodity sale processing system whereby a customer visiting a store reads code information corresponding to a commodity, and performs checkout by using a register device based on the code information that was read, the mobile terminal comprising:
a reading device that reads the code information attached to the commodity;
a storage device that stores the code information read by the reading device as commodity-for-purchase information;
a switching device that switches reading performed by the reading device from reading for storing in the storage unit to reading code information of one part of the commodity-for-purchase to confirm whether or not commodity-for-purchase information stored in the storage device is correct;
a determining device that determines whether code information that was read to confirm whether or not commodity-for-purchase information is correct is stored in the storage device; and
a reporting device that reports a result of the determining device.

2. The mobile terminal according to claim 1, wherein commodity information relating to code information that was read to confirm whether or not commodity-for-purchase information is correct is controlled so as not to be added to the storage device.

3. The mobile terminal according to claim 1, wherein the reporting device is a display unit, and displays indicator information that functions as an indicator to perform reading to confirm whether or not commodity-for-purchase information is correct.

4. The mobile terminal according to claim 3, wherein the indicator information is the number of items of commodities to perform reading to confirm whether or not commodity-for-purchase information is correct.

5. The mobile terminal according to claim 3, wherein
the storage device stores a commodity file, which contains information including a commodity name and price corresponding to the code information, for each item of commodity; and
the indicator information specifies items of commodity to perform reading to confirm whether or not commodity-for-purchase information is correct.

6. A commodity sale processing system comprising:
a mobile terminal including a reading device that reads the code information attached to the commodity;
a storage device that stores the code information read by the reading device as commodity-for-purchase information;
a confirming device that, to confirm whether or not commodity-for-purchase information stored in the storage device is correct, reads code information of one part of the commodity-for-purchase;
a switching device that switches from reading for storing in the storage unit to reading by the confirming device;
a determining device that determines whether code information that was read by the confirming device is stored in the storage device;
a reporting device that reports a result of the determining device; and
a register device that performs checkout based on commodity codes read by the mobile terminal when manipulated by a customer.

7. A register device in a commodity sale processing system whereby a customer reads code information corresponding to a commodity by manipulating a mobile terminal, stores the code information that was read as commodity-for-purchase information, transfers the stored commodity-for-purchase information to the register device, and performs checkout at the register device, the register device comprising:
a registration-information storage device that stores transferred commodity-for-purchase information;
a determining device that determines whether the code information of one part of the commodity-for-purchase read by the mobile terminal to confirm whether or not commodity-for-purchase information transferred to the register device is correct is stored in the registration-information storage device; and
a reporting device that reports a result of the determining device.

8. A register device according to claim 7, further comprising a switching device that switches reading from reading for storing transferred commodity-for-purchase information in the registration-information storage device to reading code information of one part of the commodity-for-purchase to confirm whether or not commodity-for-purchase information transferred to the register device is correct.

* * * * *